(12) United States Patent
Naccache

(10) Patent No.: US 9,342,294 B2
(45) Date of Patent: May 17, 2016

(54) INFORMATION PROCESSING DEVICE COMPRISING A READ-ONLY MEMORY AND A METHOD FOR PATCHING THE READ-ONLY MEMORY

(75) Inventor: David Naccache, Paris (FR)

(73) Assignee: CROCUS TECHNOLOGY SA, Grenoble (FR)

( * ) Notice: Subject to any disclaimer, the term of this patent is extended or adjusted under 35 U.S.C. 154(b) by 66 days.

(21) Appl. No.: 13/468,144

(22) Filed: May 10, 2012

(65) Prior Publication Data

US 2012/0290773 A1   Nov. 15, 2012

(30) Foreign Application Priority Data

May 10, 2011   (EP) ..................................... 11290219

(51) Int. Cl.
*G06F 12/00* (2006.01)
*G06F 9/445* (2006.01)
(52) U.S. Cl.
CPC ........................................ *G06F 8/66* (2013.01)
(58) Field of Classification Search
CPC .............................................................. G06F 8/66
USPC ......................................................... 711/103
See application file for complete search history.

(56) References Cited

U.S. PATENT DOCUMENTS

| | | | | |
|---|---|---|---|---|
| 5,813,043 A * | 9/1998 | Iles | ........................ | G06F 9/328 |
| | | | | 711/102 |
| 6,135,651 A * | 10/2000 | Leinfelder et al. | ............ | 717/168 |
| 6,260,157 B1 | 7/2001 | Schurecht et al. | | |
| 6,950,335 B2 | 9/2005 | Dieny et al. | | |
| 7,039,776 B2 * | 5/2006 | Wong et al. | .................... | 711/159 |
| 7,173,452 B2 * | 2/2007 | Folsom | ........................... | 326/46 |
| 7,596,721 B1 * | 9/2009 | Flake et al. | ..................... | 714/42 |
| 8,745,604 B1 * | 6/2014 | Agarwal | ........................ | 717/149 |
| 2006/0174244 A1 * | 8/2006 | Woods et al. | ................. | 717/174 |
| 2009/0327650 A1 * | 12/2009 | Neuerburg | .................... | 711/219 |
| 2010/0110744 A1 * | 5/2010 | El Baraji et al. | ................ | 365/50 |

FOREIGN PATENT DOCUMENTS

| | | |
|---|---|---|
| EP | 2204814 A1 | 7/2010 |
| EP | 2270812 A1 | 1/2011 |
| WO | 98/54639 A1 | 12/1998 |
| WO | 2009/156790 A1 | 12/2009 |

OTHER PUBLICATIONS

European Search Report for 11290219.2 dated Sep. 22, 2011.

* cited by examiner

*Primary Examiner* — Charles Rones
*Assistant Examiner* — Nanci Wong
(74) *Attorney, Agent, or Firm* — Pearne & Gordon LLP

(57) ABSTRACT

Patching a read-only memory, including a program executable by a processor is performed with a MRAM-based CAM device connected to the address bus and comparing in the background the addresses requested by the processor with the elements of a vector of addresses. The match-in-place operation is done in parallel on all the elements of the vector and typically is performed in less than a clock cycle. If a match is found, the CAM device outputs a diversion address that's used to retrieve a substitution machine code element from a flash memory that is presented to the processor in lieu of the one addressed in the ROM. This patching scheme is totally transparent, has little overhead, and extreme granularity.

9 Claims, 2 Drawing Sheets

INFORMATION PROCESSING DEVICE COMPRISING A READ-ONLY MEMORY AND A METHOD FOR PATCHING THE READ-ONLY MEMORY

FIELD

Embodiments of the present invention relate to an information processing device comprising a read-only memory containing program instructions or data, and second memory containing patch instructions, correcting the program or the data stored in the read-only memory. The invention relates also to a read-only memory patching method.

DESCRIPTION OF RELATED ART

Information processing devices include customarily a processor and a digital memory on which a program is stored that is executed by the processor. The program may include for example executable instructions that can be fetched and executed by the processor, or also digital data needed by the processor for the execution of its intended functions. Various form of digital storage devices are available and are used in information processing devices. A read-only memory (ROM) is a memory that allows reading, but not modifying the data it stores.

Mask ROMs are generally fabricated with the desired data permanently stored in it and present the advantage of being very cheap when produced in large numbers. For this reason, ROM is used in many smart card chip or other information processing devices that must contain a permanent firmware. After the final ROM is produced on a mass scale, however, it is in general necessary to modify in part the program and data stored, to correct the unavoidable program errors, or for other reasons.

Several ROM-patching methods and devices have therefore been developed, in which instructions contained in the original ROM are replaced, in the execution of the program, with instructions contained in a rewritable memory distinct from the ROM memory, often a Flash memory.

Many known patching method rely on adding preventively special software instructions at the time of masking the ROM, to check at execution time whether determined sets of instructions should be executed as they are stored in the ROM, or rather replaced by patched instructions.

For example, know patching system may insert an automatic call to a function check(x) at the beginning of each function. When inserted check(x) is hardcoded with an argument x that represents the function it was implanted into. The function check(x) searches if the argument x matches with one entry of an indirection table in the patch memory and, if a hit is found, diverts the execution to the address of a patched routine in the flash whose entry address is stored in the indirection table, otherwise returns to the caller.

The above known mechanism allow to divert the execution after ROM masking if a bug is discovered in any specific function of the code. Examples of these and similar techniques can be found, for instance, in WO2009156790, U.S. Pat. No. 6,260,157 or references therein. This manner of patching, however, presents several drawbacks: It requires a special compilation method to insert automatic calls to the function check( ); it causes an increase of the code size and a performance degradation, due to the extra calls to the function check( ) and cycles spent in checking the indirection table, even if no patch is applied. In relation to the above, the granularity of the method is of necessity rather coarse: when a bug occurs, often the entire function must be rewritten in flash memory.

There is therefore a need for a patching method and a corresponding information processing device that are free from the above shortcomings, and in particular a method and a device that does not rely on special compilation tools and allows to patch specific assembly instructions, or groups thereof, without causing code increases or slowing down the execution of the program when no patches are fixed.

U.S. Pat. No. 7,596,721 describes a method and structures for providing patches to embedded ROM firmware while avoiding overhead and mentions the use of a CAM memory. US2010110744 and EP2270812 describe ternary content-addressable MRAM. WO9854639 describe a software patch method using a CAM memory. US2006174244 describes a method for enabling control transfer in a firmware through CAM.

SUMMARY

According to the invention, these aims are achieved by the object of the appended claims, and in particular by an information processing device including a read-only memory 120, including executable instructions or data, a processor 170 capable of addressing said read-only memory 120 and fetch said executable instructions or data across a bus 28, 48, a CAM device 160 connected to said bus and arranged to compare the addresses requested by the processor 170 with the elements of a vector $x_i$ of addresses to be patched and, if the address requested by the processor matches with one of the elements of the vector $x_i$, to present to the processor a substitution executable instruction or data in place of an executable instruction or data addressed by the processor 170 in the read-only memory, and by the corresponding method.

BRIEF DESCRIPTION OF THE DRAWINGS

The invention will be better understood with the aid of the description of an embodiment given by way of example and illustrated by the figure, in which.

DETAILED DESCRIPTION OF POSSIBLE EMBODIMENTS OF THE INVENTION

Figure 1:
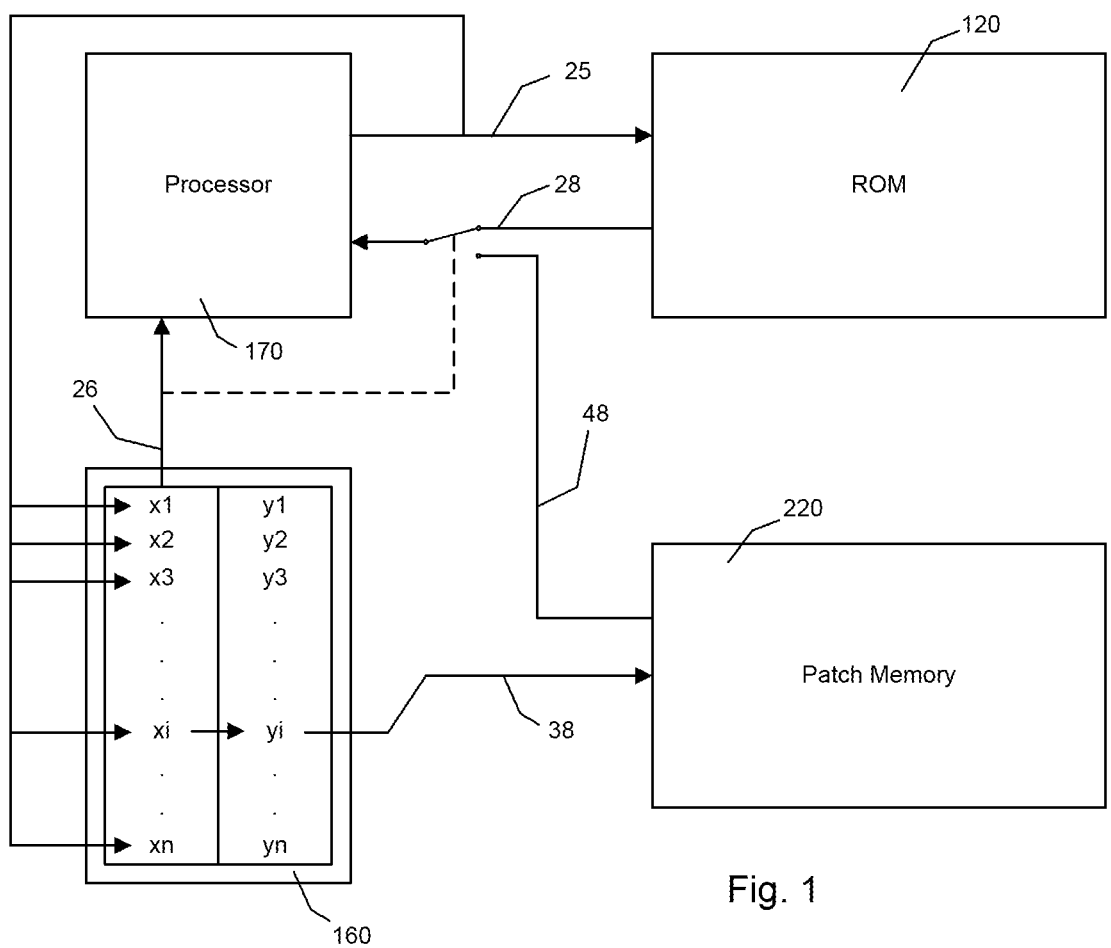
FIG. 1 shows, in a schematic simplified form an information processing device according to an aspect of the present invention.

With respect to FIG. 1, an embodiment of the present invention includes a smart card equipped with a processor 170 that executes software stored permanently in a memory 120. A masked ROM memory is preferred in this position, thank to its very favourable cost.

In a conventional manner, the processor 170 addresses the memory 120 via the address bus 25 and fetches the corresponding instructions, or instruction elements, on the instruction/data bus 28. The invention can be applied both to processors with a single external storage for program instruction and data (Von Neumann architecture) and to systems with separate Program and Data memories (Harvard architecture). The following examples deal with the patching of executable instructions, but it must be understood that the system and methods of the invention can be adapted to and include also the patching of data.

The address written on the address bus 25 is presented, in addition to the ROM memory 120, to a CAM (Content-Addressable Memory) device 160 that stores a vector of addresses in the ROM that must be patched. According to an aspect of the invention, The CAM device is a based on magnetoresistive RAM cells (MRAM-CAM). Unlike RAMs which access a word based on its address, CAMs access a word based on its contents. A CAM stores data in a similar fashion to a conventional RAM. However, "reading" the CAM involves providing input data to be matched, then searching the CAM for a match so that the address of the match can be output. A CAM is designed such that the user supplies a data word and the CAM searches its entire memory in parallel to see if that data word is stored anywhere in it. If the data word is found, the CAM returns a list of one or more storage addresses where the word was found.

MRAM CAMs are described, among other, in European patent EP2204814, assigned to the applicant, that is hereby incorporated by reference in its entirety, and to which the reader is addressed for further information.

Figure 2:
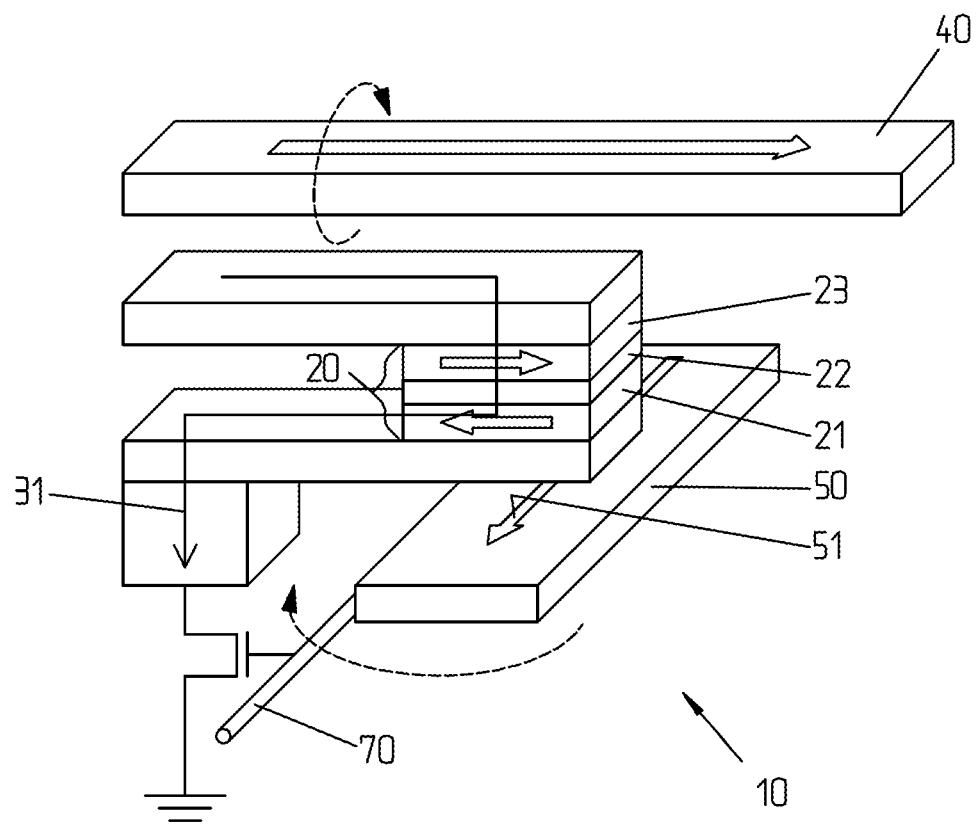
FIGS. 2, 3 illustrate schematically a MRAM-based CAM used in an embodiment of the present invention.
Figure 3:
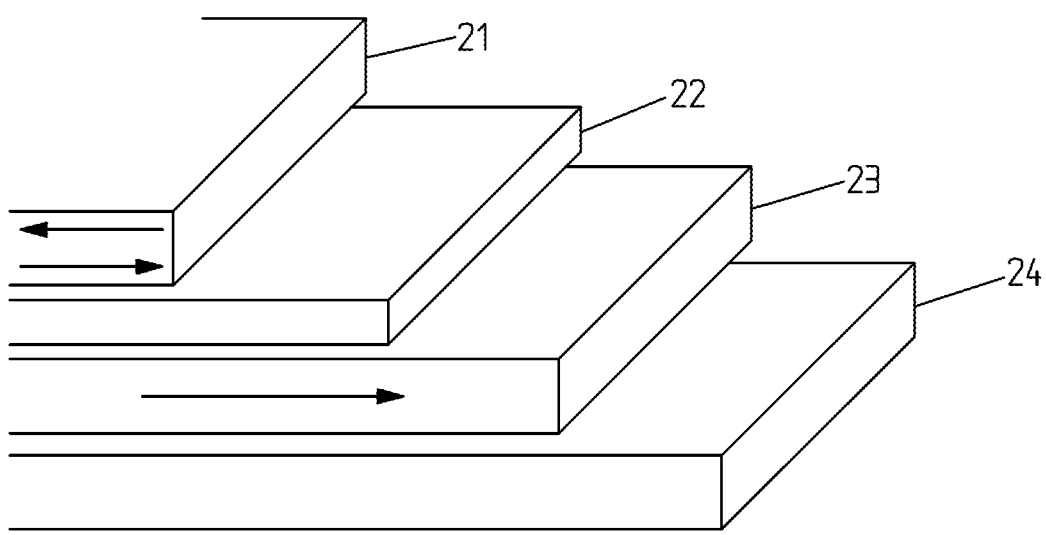

FIGS. 2 and 3 illustrate schematically a MRAM cell 10 suitable for the CAM device of the invention. The MRAM-based CAM cell 10 comprises a magnetic tunnel junction 20, formed by an insulating layer 22 disposed between a storage layer 23 and a sense layer 21. Preferably the storage layer 23 is made of a hard ferromagnetic material, while the sense layer is made of a low coercivity, soft ferromagnetic material. Preferably the MRAM cell 10 also includes, below the storage layer 23, an anti-ferromagnetic pinning layer 24.

The write operation of the MRAM-based CAM cell 10 is based for example on a thermally-assisted switching method (TAS) as disclosed in U.S. Pat. No. 6,950,335, for example. This is obtained by driving an electric current 51 in the field line 50 and asserting at the same time the word line 70, in order to switch on the selection transistor 60, letting a pulse of heating current 31 flows through the tunnel junction 20. The temperature of the magnetic junction thus rises at a determined high temperature threshold, while the junction is immersed in the magnetic field generated by the electric current 51 in the field line 50. At the determined high temperature threshold, the magnetization of the storage layer 23 can be aligned in the magnetic field. The junction 20 is then cooled by inhibiting the junction current pulse 31 to a low temperature threshold such that the magnetization of the storage layer 23 is frozen in a new stored logic state, conventionally designated as "1" or "0" according to the direction of the magnetization and the polarity of the field current.

In alternative to the above, the writing could be performed by a spin-polarized magnetic current (STT or Spin Transfer Torque switching) or by a Current-induced magnetic switching (CIMS) schema that do not rely on external magnetic field, or in any other manner. These variants are also comprised in the scope of the present invention.

During a search operation of the MRAM-based CAM cell 10, a search bit is provided to the sense layer 21 via the field line 50. The current circulating in the field line 50 during the read operation generates a magnetic field sufficient to modify the polarization of the sense layer 21, but not that of the storage layer 23. The magnetization direction of the sense layer 21 is then compared with that of the storage layer by measuring the resistance of the magnetic tunnel junction 20. A low resistance indicates that the polarizations of the storage layer and of the sense layer are parallel, hence that they both contain a "1" or a "0", whereas in all cases a high resistance is measured. One can see that the MRAM-based CAM cell 10 realizes intrinsically a $\overline{XOR}$ of the stored bit and of the search bit without additional components. By replicating the structure of the CAM cell 10, it is possible to realize a CAM device that in able to compare in place and in parallel fashion a search pattern with a large number of keys. This match-in-place operation is very fast and typically is done within one clock cycle of the microprocessor.

The MRAM-based CAM device of the invention could optionally include a second field line 40, used to polarize the storage layer or the sense layer along a direction orthogonal to that of the first field line 50. Advantageously, this allows the realization of ternary CAM devices (TCAM) allowing a third logical value "X" besides "0" and "1", that is treated as a wildcard value. According to a non-represented variant, the CAM device might use differential cells, each including two tunnel junctions.

In an embodiment not represented, the TCAM device can comprise a so-called "dual junction" such as described in unpublished European patent application, filed by the present applicant under application number EP11290150. The magnetic tunnel junction 20 of the dual junction TCAM device further comprises a second storage layer and a second tunnel barrier layer comprised between the sense layer 21 and the second storage layer. The second storage layer has a magnetization that can be freely oriented at a second high temperature threshold, typically lower than the low temperature threshold. The logical value "X" can then be obtained by orienting the magnetization of the two storage layers 21 antiparallel.

Referring again to FIG. 1, the address present on the bus 25 is also fed to the input of the CAM device 160, and compared with a vector of stored addresses $(x_i)$ stored in the device. If the address does not match any of the stored addresses, the CAM device does not intervene, and the processing of the operation continues as usual: the processor fetches via the instruction/data bus 28 the addressed instruction or instruction element contained in the ROM 120 and executes it.

If on the other hand the address present on the bus 25 matches one of the stored addresses $x_i$, the CAM device issues an interrupt 26 (or causes an interrupt to be issued) to the processor 28. As a consequence, the machine code element present in the bus 28 is not read. At the same time, the CAM device 168 outputs a diversion address $y_i$ corresponding to the address $x_i$ (for example, $x_i$ is used as an addressing key in the CAM device 160 to retrieve the diversion address $y_i$), and this diversion address is used to select a memory position in a patch memory 220. The patch memory 220 is preferably a non-volatile storage, for example a flash memory, but could be a MRAM memory as well. In a variant, the check-in-place CAM device 160 and the patch memory 220 could be integrated in a single unit that, in case of a match with one of the stored addresses $x_i$, directly outputs the value of a substitution machine code element, rather than its address.

The patched machine code element is then presented to the processor (arrow 48) in place of the one that was originally addressed. The interrupt 21 being at this moment inactive, the processor 170 resumes the program execution as if the ROM had originally comprised the patched code, in a fully transparent manner.

With respect to the existing art, the proposed solution does not cause code increase or a performance penalty if no bugs are fixed, and does not rely on special compilation tools. When a bug is patched, the overhead in term of performances is minimal, and reduces to the loss of one clock cycle in order to discard the original instruction. Furthermore, the granularity of the proposed method is extremely fine. If needed, one single machine code element can be modified, without need to rewrite entire functions. Due to the non-volatile nature of MRAM, the vectors $x_i$, $y_i$ are retained indefinitely in absence of power.

The proposed MRAM-based CAM devices are extremely efficient in term of power consumption, density, and cost, and lend themselves especially well to the patching of miniaturized devices, low-power devices, and smart cards. Another advantage of MRAM storage in this case is that it is not volatile: the vectors $x_i$ and $y_i$, once programmed, are retained indefinitely also in absence power supply.

LIST OF REFERENCE NUMBERS AND SYMBOLS $x_i$ address in ROM instruction
$y_i$ address in DRAM patch memory
10 MRAM-based CAM cell
20 magnetic Tunnel Junction
21 Sense layer
22 insulating layer
23 storage layer
24 pinning layer
25 address bus
26 interrupt
  28 instructions/data bus
  31 heating current
  38 addressing of the second memory
40 second field line
48 patched instructions
50 field line
51 electric current
60 selection transistor
70 word line
120 ROM memory
160 check-in-place CAM device
170 processor
220 patch memory

The invention claimed is:

1. A method of patching executable instructions or data in a read-only memory accessible by a processor including a hardware interrupt interface and input bus, comprising the steps of:
providing a CAM device storing a vector of addresses of cells that must be patched in the read-only memory,
comparing the addresses of executable instructions or data in the read-only memory with the elements of the vector stored in the CAM device,
if the address requested by the processor matches with one of the elements in the vector of addresses to be patched, presenting to the processor a substitution executable instruction or data to replace an executable instruction or data already provided to the processor input bus when addressed by the processor in the read-only memory with a patched executable instruction or data stored in a patch memory; the CAM device including a MRAM-TCAM device comprising a plurality of MRAM memory cells, each MRAM memory cell comprising at least one magnetic tunnel junction, and
interrupting the processor by applying an interrupt signal to the interrupted interface if the address requested by the processor matches with one of the elements of the vector, so as to prevent the reading of the executable instruction of data provided on the processor input bus by the read-only memory, and
removing the interrupt signal from the interrupt interface after application of the patched executable instruction or data to the processor input bus to cause the processor to read the patched executable instruction or data.

2. The method of claim 1, including a step of retrieving the substitution executable instruction or data from a second memory, based on an address stored in a target vector included in the CAM device.

3. An information processing device comprising a read-only memory, comprising executable instructions or data, a processor including a hardware interrupt interface and input bus, said processor being configured for addressing said read-only memory and fetching said executable instructions or data across a bus, a CAM device connected to said bus and arranged to compare the addresses requested by the processor with the elements of a vector of addresses to be patched and, if the address requested by the processor matches with one of the elements of the vector, to present to the processor a substitution executable instruction or data to replace an executable instruction or data already provided to the processor input bus when addressed by the processor in the read-only memory with a patched executable instruction or data stored in a patch memory; the CAM device being a MRAM device comprising a plurality of MRAM memory cells, each MRAM memory cell comprising at least one magnetic tunnel junction, wherein the CAM device is arranged to interrupt the processor by applying an interrupt signal to the interrupt interface if the address requested by the processor matches with one of the elements of the vector of addresses to be patched, said interrupt signal thereby interrupting the processor to prevent the reading of the executable instruction or data provided on the processor input bus by the read-only memory, and wherein the interrupt signal is removed from the interrupt interface after application of the patched executable instruction or data to the processor input bus to cause the processor to read the patched executable instruction or data.

4. The information device of claim 3, comprising a second memory containing patched instructions or data, wherein the CAM device includes a target vector storing, for each element of the vector of addresses to be patched, the address in the second memory of the substitution executable instruction or data.

5. The information device of claim 3, contained in a smart card.

6. An information processing device comprising a read-only memory, comprising:
executable instructions or data stored in the read-only memory,
a processor including dedicated hardware interrupt input and input bus, said processor being configured for addressing said read-only memory and fetching said executable instructions or data across a bus,
a CAM device connected to said bus and having an output connected to said interrupt input and being arranged to compare the addresses requested by the processor with the elements of a vector of addresses to be patched and, if the address requested by the processor matches with one of the elements of the vector, to present to the processor a substitution executable instruction or data to replace an executable instruction or data already provided to the processor input bus when addressed by the processor in the read-only memory with a patched executable instruction or data stored in a patch memory; the CAM device being a MRAM device comprising a plurality of MRAM memory cells, each MRAM memory cell comprising at least one magnetic tunnel junction, wherein the CAM device is arranged to interrupt the processor by applying an interrupt signal directly to the interrupt input if the address requested by the processor matches with one of the elements of the vector of addresses to be patched, so as to prevent the reading of the executable instruction of data provided on the processor input bus by the read-only memory, and wherein the interrupt signal is removed from the interrupt interface after application of the patched executable instruction or data to the processor input bus to cause the processor to read the patched executable instruction or data.

7. The information device of claim 6, comprising a second memory containing patched instructions or data, wherein the CAM device includes a target vector storing, for each element of the vector of addresses to be patched, the address in the second memory of the substitution executable instruction or data.

8. The information device of claim 6, contained in a smart card.

9. An information processing device comprising a read-only memory, comprising executable instructions or data, a processor including a hardware interrupt interface and input bus, said processor being configured for addressing said read-only memory and fetch said executable instructions or data across a bus, a CAM device connected to said bus and arranged to compare the addresses requested by the processor with the elements of a vector of addresses to be patched and, if the address requested by the processor matches with one of the elements of the vector, to present to the processor a substitution executable instruction or data to replace an executable instruction or data already provided to the processor input bus when addressed by the processor in the read-only memory with a patched executable instruction or data stored in a patch memory;

the CAM device being a MRAM device comprising a plurality of MRAM memory cells, each MRAM memory cell comprising at least one magnetic tunnel junction, wherein the CAM device is configured such that, if the address requested by the processor matches with one of the elements of the vector of addresses to be patched, the CAM device will, interrupt the processor by applying an interrupt signal to the interrupt interface so as to prevent the reading of the executable instruction of data provided on the processor input bus by the read-only memory, and wherein the interrupt signal is removed from the interrupt interface after application of the patched executable instruction or data to the processor input bus to cause the processor to read the patched executable instruction or data, retrieve, from an address in a patch memory which is associated with said address requested by the processor, patched executable instructions or data, and present the patched executable instructions or data to the processor in replacement of executable instructions or data at the address requested by the processor.

* * * * *